United States Patent
Kiser

(10) Patent No.: US 7,186,982 B1
(45) Date of Patent: Mar. 6, 2007

(54) METHOD FOR CALIBRATING A DUAL CHANNEL SCANNER BACKGROUND

(75) Inventor: Larry L. Kiser, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/217,814

(22) Filed: Sep. 1, 2005

(51) Int. Cl.
*H03H 21/00* (2006.01)

(52) U.S. Cl. .............................. 250/363.09
(58) Field of Classification Search .......... 250/363.09, 250/363.08
See application file for complete search history.

(56) References Cited

U.S. PATENT DOCUMENTS

| | | | |
|---|---|---|---|
| 4,408,231 A | 10/1983 | Bushaw et al. | |
| 4,984,013 A | 1/1991 | Terashita | |
| 5,016,043 A | 5/1991 | Kraft et al. | |
| 5,309,257 A | 5/1994 | Bonino et al. | |
| 5,373,151 A * | 12/1994 | Eckel et al. | 250/208.1 |
| 5,400,161 A * | 3/1995 | Lambert, Jr. | 349/1 |
| 5,654,809 A | 8/1997 | Beeman et al. | |
| 5,694,474 A * | 12/1997 | Ngo et al. | 381/66 |
| 5,982,957 A | 11/1999 | DeCaro et al. | |
| 6,016,161 A | 1/2000 | Robinson | |
| 6,359,681 B1 * | 3/2002 | Housand et al. | 356/4.01 |
| 6,466,337 B1 | 10/2002 | Suhr et al. | |
| 6,546,132 B1 | 4/2003 | Bhattacharjya et al. | |
| 6,571,189 B2 | 5/2003 | Jensen et al. | |
| 6,650,416 B2 | 11/2003 | Tandon et al. | |
| 6,654,048 B1 | 11/2003 | Barrett-Lennard et al. | |
| 6,654,493 B1 | 11/2003 | Hilliard et al. | |
| 6,747,767 B1 | 6/2004 | Heuer et al. | |
| 6,750,992 B1 | 6/2004 | Holub | |
| 6,753,914 B1 | 6/2004 | Frost | |
| 6,822,766 B2 | 11/2004 | Hill et al. | |
| 6,900,448 B1 | 5/2005 | Thompson | |
| 2006/0197847 A1 * | 9/2006 | Johnson et al. | 348/229.1 |

* cited by examiner

*Primary Examiner*—Otilia Gabor
(74) *Attorney, Agent, or Firm*—Thompson Hine LLP

(57) ABSTRACT

A method for calibrating at least some individual light sensor elements of a linear sensor array of a scanner, wherein output values of first and second pluralities of elements are carried, respectively, by first and second output channels. A relative gain (Stored Gain) for each of such elements is calculated from a scan of a light calibration strip area of substantial uniformity. Output values of such elements are obtained from a scan of a light calibration strip area of unknown uniformity. An average is calculated of the obtained output values of the first elements (First Light Average) and an average is calculated of the obtained output values of the second elements (Second Light Average). A final gain for each first and second element is calculated using at least its Stored Gain and for second elements only also using the First and Second Light Averages.

20 Claims, 1 Drawing Sheet

METHOD FOR CALIBRATING A DUAL CHANNEL SCANNER BACKGROUND

1. FIELD OF THE INVENTION

The present invention relates generally to scanners, and more particularly to a method for calibrating at least some of the individual light sensor elements of a linear sensor array of a scanner wherein the outputs of a first plurality of first elements (such as odd-numbered elements) are carried by a first output channel and the outputs of a second plurality of second elements (such as even-numbered elements) are carried by a second output channel.

2. DESCRIPTION OF THE RELATED ART

Known scanners include those having a linear array of light sensor elements wherein, to increase processing speed, the outputs of odd-numbered elements are carried by a first output channel and the outputs of even-numbered elements are carried by a second output channel. Known methods for calibrating the individual light sensor elements of a linear sensor array of a scanner include using conventionally-obtained gains for the uncorrected outputs of each light sensor element based on a scan of a white area of a calibration target and using conventionally-obtained offsets of the uncorrected outputs of each light sensor element based on a scan of a black area of a calibration target. In one known example, gains and offsets are conventionally calculated using histograms of the light sensor element outputs from non-factory scans.

SUMMARY OF THE INVENTION

A first method is for calibrating a plurality of individual light sensor elements of a linear sensor array of a scanner, wherein output values of odd-numbered elements are carried by a first output channel and output values of even-numbered elements are carried by a second output channel. The first method includes calculating a relative gain (Stored Gain) for each element from a scan of a light calibration strip area of substantial uniformity. The first method also includes obtaining output values of the elements from a scan of a light calibration strip area of unknown uniformity. The first method also includes calculating an average of the obtained output values of the odd-numbered elements (Odd Light Average) and an average of the obtained output values of the even-numbered elements (Even Light Average) from the scan of the light calibration strip area of unknown uniformity. The first method also includes calculating a low pass gain for each element from the obtained output values from the scan of the light calibration strip area of unknown uniformity. The first method also includes calculating an adjusted gain for each element. The adjusted gain for each even-numbered element equals its Stored Gain. The first method also includes calculating an adjusted gain for each odd-numbered element. The adjusted gain for each odd-numbered element equals its Stored Gain times the Even Light Average divided by the Odd Light Average. The first method also includes calculating a final gain for each element as equal to its adjusted gain times its low pass gain.

A second method is for calibrating a plurality of individual light sensor elements of a linear sensor array of a scanner, wherein output values of odd-numbered elements are carried by a first output channel and output values of even-numbered elements are carried by a second output channel. The second method includes calculating Stored Gain for each element from a scan of a light calibration strip area of substantial uniformity. The second method also includes obtaining output values of the elements from a scan of a light calibration strip area of unknown uniformity. The second method also includes calculating the Odd Light Average and the Even Light Average from the scan of the light calibration strip area of unknown uniformity. The second method also includes calculating a low pass gain for each element from the obtained output values from the scan of the light calibration strip area of unknown uniformity. The second method also includes calculating an adjusted gain for each element. The adjusted gain for each odd-numbered element is equal to its Stored Gain, and the adjusted gain for each even-numbered element as equal to its Stored Gain times the Odd Light Average divided by the Even Light Average. The second method also includes calculating a final Gain for each element, which is equal to its adjusted gain times its low pass gain.

A third method is for calibrating at least some individual light sensor elements of a linear sensor array of a scanner, wherein output values of a first plurality of first elements are carried by a first output channel and output values of a second plurality of second elements are carried by a second output channel. The third method includes calculating a Stored Gain for each of the first and second elements from a scan of a light calibration strip area of substantial uniformity. The third method also includes obtaining output values of the first and second elements from a scan of a light calibration strip area of unknown uniformity. The third method also includes calculating an average of the obtained output values of the first elements (First Light Average) and an average of the obtained output values of the second elements (Second Light Average) from the scan of the light calibration strip area of unknown uniformity. The third method also includes calculating a low pass gain for each of the first and second elements from the obtained output values from the scan of the light calibration strip area of unknown uniformity. The third method also includes calculating an adjusted gain for each element. The adjusted gain for each first element is equal to its Stored Gain, and the adjusted gain for each second element equals its Stored Gain times the First Light Average divided by the Second Light Average. The third method also includes calculating a final gain for each first and second element as equal to its adjusted gain times its low pass gain.

In one example of each of the first, second and third methods, output values of light sensor elements of a linear sensor array of a dual channel scanner are quickly calibrated including compensation for differences between channels.

DETAILED DESCRIPTION

Figure 1:
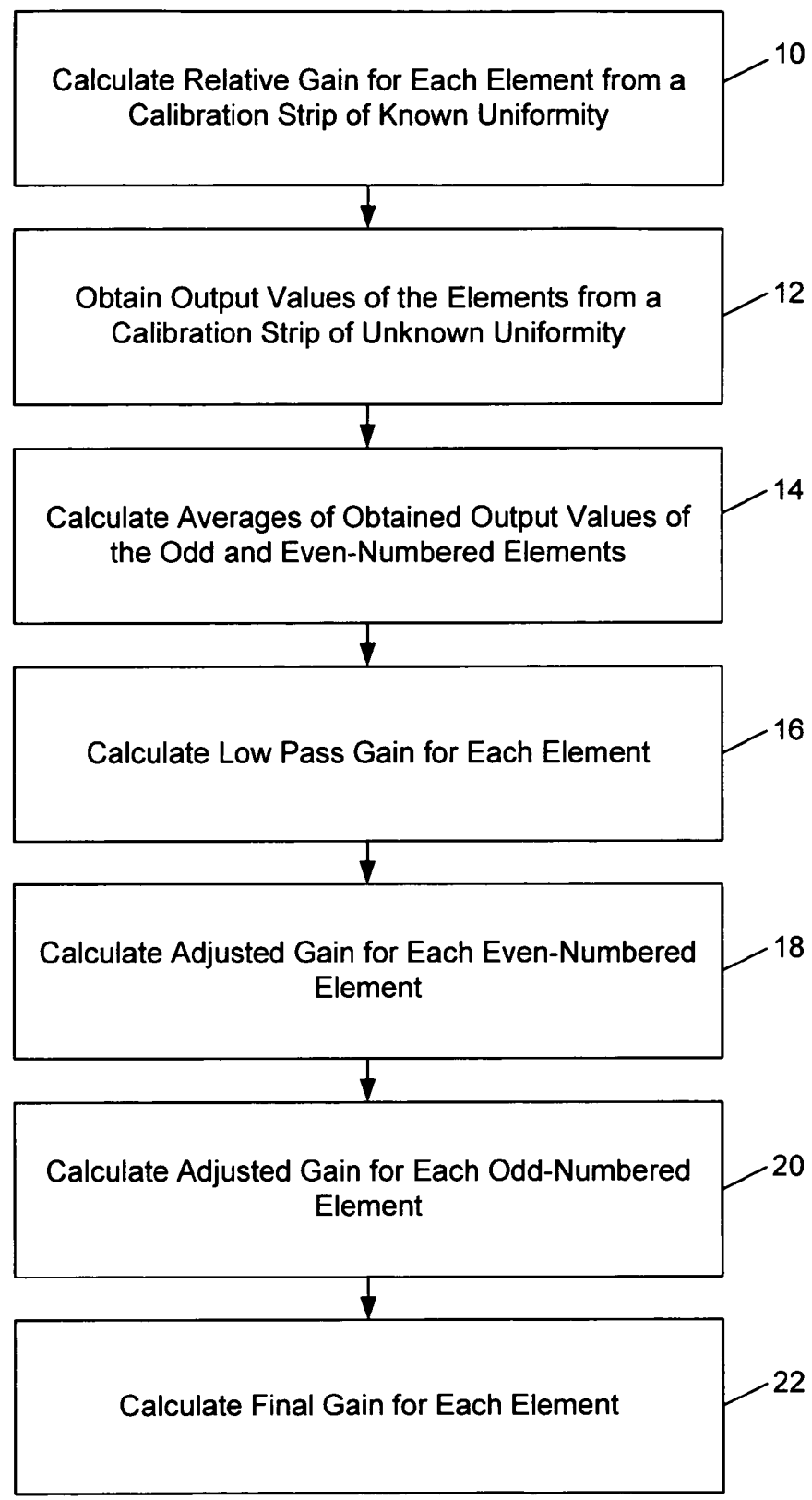
FIG. 1 is a block diagram of a first method of the present invention.

Referring to FIG. 1, a first method of the present invention is for calibrating a plurality of individual light sensor elements of a linear sensor array of a scanner, wherein output values of odd-numbered elements are carried by a first output channel and output values of even-numbered elements are carried by a second output channel. The first method includes, as indicated generally by block 10 of FIG.

1, calculating a relative gain (Stored Gain) for each element from a scan of a light calibration strip area of substantial uniformity. The first method also includes, as indicated generally by block 12 of FIG. 1, obtaining output values (which can also be referred to as light output values) of the elements from a scan of a light calibration strip area of unknown uniformity. The first method also includes, as indicated generally by block 14 of FIG. 1, calculating an average of the obtained output values of the odd-numbered elements (Odd Light Average) and an average of the obtained output values of the even-numbered elements (Even Light Average) from the scan of the light calibration strip area of unknown uniformity. The first method also includes, as indicated generally by block 16 of FIG. 1, calculating a low pass gain for each element from the obtained output values from the scan of the light calibration strip area of unknown uniformity. The first method also includes, as indicated generally by block 18 of FIG. 1, calculating an adjusted gain for each even-numbered element, which is equal to its Stored Gain. The first method also includes, as indicated generally by block 20 of FIG. 1, calculating an adjusted gain for each odd-numbered element such that the adjusted gain for each odd-numbered element is equal to its Stored Gain times the Even Light Average divided by the Odd Light Average. The first method also includes, as indicated generally by block 22 of FIG. 1, calculating a final gain for each element such that the final gain of each element is equal to its adjusted gain times its low pass gain. It is noted that a "light calibration strip area" is a calibration strip area adapted to be scanned for purposes including calibrating the gains of light sensor elements of a linear sensor array of a scanner.

Some of the description of the first method of the previous paragraph is herein restated in equation form as:

adjusted gain=Stored Gain for even-numbered elements;

adjusted gain=Stored Gain×Even Light Average/Odd Light Average for odd-numbered elements; and final gain=adjusted gain×low pass gain for each element.

Calculating a fully-compensated gain or relative stored gain for each element from a scan of a light calibration strip area is within the ordinary level of skill of the artisan. "Fully-compensated gain" for purposes of the present invention means that the Stored Gain for each element remains unaffected by channel-to-channel gain differences and for illuminant and optical gain non-uniformities.

It is noted that calculating a fully-compensated gain for each element from a scan of a light calibration strip area and obtaining output values of the elements from a scan of a light calibration strip area are independent of what and/or who caused the scan to be performed. What and/or who caused a scan of a light calibration strip area to be performed is not considered part of the broadly defined first method of FIG. 1.

Calculating an average of the obtained output values includes any broadly described mathematical average such as, without limitation, an arithmetic mean value, a median value, a modal value, etc. In one example, the average is the arithmetic mean value.

Calculating a low pass gain for each element from obtained output values from a scan of a light calibration strip area is within the ordinary level of skill of the artisan. For purposes of the present invention, "low pass gain" means a gain which is calculated by using a smoothing filter which reduces sensor to adjacent sensor(s) output value gain variability.

In one implementation, the first method also includes adjusting the gain of each element such that it is equal its Final Gain. In one illustration of the first method, the obtained output values of the elements from the scan of the light calibration strip area of unknown uniformity are obtained average output values of each element from a multi-line scan of the light calibration strip area of unknown uniformity.

In one enablement of the first method, the Stored Gain for each element is calculated from a factory scan of the light calibration strip area of substantial uniformity. In one variation, the obtained output values of the elements from the scan of the light calibration strip area of unknown uniformity are obtained from a non-factory scan of the light calibration strip area of unknown uniformity. In one modification, the non-factory scan and the factory scan are of a same light calibration strip area but were performed at different times. In one illustration, the non-factory scan was performed at a user site after previous operation of the scanner at the user site has caused the light calibration strip area to be of unknown uniformity.

In one employment of the first method, the light calibration strip area of substantial uniformity is a white calibration strip area of substantial uniformity, and the light calibration strip area of unknown uniformity is a white calibration strip area of unknown uniformity. In one embodiment of the first method, the elements are white-light sensor elements.

In one extension, the first method includes calculating a fully-compensated offset (Stored Offset) for each element from a scan of a dark calibration strip area of substantial uniformity. In this extension, the first method also includes obtaining dark output values of the elements from a scan of a dark calibration strip area of unknown uniformity. In this extension, the first method also includes calculating an average of the obtained dark output values of the odd-numbered elements (Odd Offset Average) and an average of the obtained dark output values of the even-numbered elements (Even Offset Average) from the scan of the dark calibration strip area of unknown uniformity. In this extension, the first method also includes calculating a Low Pass Offset for each element from the obtained dark output values from the scan of the dark calibration strip area of unknown uniformity. In this extension, the first method also includes either calculating an adjusted Offset for each element. The adjusted offset for each even-numbered element may be equal to its Stored Offset and the adjusted Offset of each odd-numbered element may be equal to its Stored Offset plus the Odd Offset Average minus the Even Offset Average, or the adjusted offset for each odd-numbered element may be equal to its Stored Offset, and the adjusted offset of each even-numbered element may be equal to its Stored offset plus the Even Offset Average minus the Odd Offset Average. In this extension, the first method also includes calculating a final offset for each element such that the final offset of each element is equal to its respective adjusted Offset plus its low pass offset. It is noted that a "dark calibration strip area" is a calibration strip area adapted to be scanned for purposes including calibrating the offsets of light sensor elements of a linear sensor array of a scanner.

Some of the description of the extension of the previous paragraph is herein restated in equation form as:

adjusted offset=Stored Offset for even-numbered elements and adjusted offset=Stored Offset+Odd Offset Average–Even Offset Average for odd-numbered elements; or adjusted offset=Stored Offset for odd-numbered elements and adjusted offset=Stored Offset+Even Offset Average–Odd Offset Average for even-numbered elements; and final offset=adjusted offset+low pass offset for each element.

In one employment of this extension, the dark calibration strip area of substantial uniformity is a black calibration strip area of substantial uniformity, and the black calibration strip area of unknown uniformity is a black calibration strip area of unknown uniformity.

Calculating a fully-compensated offset or relative offset for each element from a scan of a dark calibration strip area is within the ordinary level of skill of the artisan. For purposes of the description of the present invention, "fully-compensated offset" means an offset for each element which corrects at least for channel-to-channel offset differences and for illuminant and optical offset non-uniformities.

It is noted that calculating a fully-compensated offset for each element from a scan of a dark calibration strip area and obtaining dark output values of the elements from a scan of a dark calibration strip area are independent of what and/or who caused the scan to be performed. What and/or who caused a scan of a dark calibration strip area to be performed is not considered part of the broadly defined extension of the first method of FIG. 1.

Calculating an average of the obtained dark output values includes any broadly described mathematical average such as, without limitation, an arithmetic mean value, a median value, a modal value, etc. In one example, the average is the arithmetic mean value.

Calculating a low pass offset for each element from obtained dark output values from a scan of a dark calibration strip area is within the ordinary level of skill of the artisan. For purposes of the description of FIG. 1, "low pass offset" means an offset which is calculated by using a smoothing filter which reduces sensor to adjacent sensor(s) output value offset variability.

In one illustration of the first method, shielded or defective elements (if present) would not be included in the plurality of individual light sensor elements calibrated for gain by the first method and/or calibrated for offset by the extension of the first method. In an alternate extension of the first method, offsets are conventionally calculated using dark output values of each element from a scan, using no illumination, of the light calibration strip area of unknown uniformity or are conventionally calculated using output values of shielded elements if some of the light sensor elements of the linear sensor array are shielded elements.

A second method of the present invention is identical to the previously-described first method except that the calculated adjusted gain for each odd-numbered element equals its Stored Gain and the adjusted gain for each even-numbered element equals its Stored Gain times the Odd Light Average divided by the Even Light Average.

Such exceptions described in the previous paragraph are herein restated in equation form as:

adjusted gain=Stored Gain for odd-numbered elements; and adjusted gain=Stored Gain×Odd Light Average/Even Light Average for even-numbered elements.

It is noted that the implementations, enablements, extensions, etc. of the first method are equally applicable to the second method with "even" and "odd" reversed.

A third method of the present invention is for calibrating at least some individual light sensor elements of a linear sensor array of a scanner, wherein output values of a first plurality of first elements are carried by a first output channel and output values of a second plurality of second elements are carried by a second output channel. The third method includes calculating Stored Gain for each of the first and second elements from a scan of a light calibration strip area of substantial uniformity. The third method also includes obtaining output values (which can also be referred to as light output values) of the first and second elements from a scan of a light calibration strip area of unknown uniformity. The third method also includes calculating an average of the obtained output values of the first elements (First Light Average) and an average of the obtained output values of the second elements (Second Light Average) from the scan of the light calibration strip area of unknown uniformity. The third method also includes calculating a low pass gain for each of the first and second elements from the obtained output values from the scan of the light calibration strip area of unknown uniformity. The third method also includes calculating an adjusted gain for each element, where the adjusted gain for each first element equals its Stored Gain and the adjusted gain for each second element equals its Stored Gain times the First Light Average divided by the Second Light Average. The third method also includes calculating a final gain for each first and second element, where such final gain equals to its adjusted gain times its low pass gain.

In one application of the third method, there are over one thousand first elements and over one thousand second elements.

In one extension of the third method, the scanner includes a third output channel and the linear sensor array includes a third plurality of third light sensor elements, wherein output values of the third plurality of third elements are carried by the third output channel. In this extension, the third method also includes: calculating a Stored Gain for each of the third elements from the scan of the light calibration strip area of substantial uniformity; obtaining output values (which can also be referred to as light output values) of the third elements from the scan of the light calibration strip area of unknown uniformity; calculating an average of the obtained output values of the third elements (Third Light Average) from the scan of the light calibration strip area of unknown uniformity; calculating a low pass gain for each of the third elements from the obtained output values from the scan of the light calibration strip area of unknown uniformity; calculating an adjusted gain for each third element, the adjusted gain for each third element being equal to such third element's Stored Gain times the First Light Average divided by the Third Light Average; and calculating a final gain for each third element, where such final gain is equal to its adjusted gain times its low pass gain. It is noted that the third method likewise can be extended for any number of additional channel(s) of the scanner.

It is noted that the extension of the first method involving offsets is equally applicable to the third method and to its extension with "first element" replacing "even-numbered element", with "second element" or "third element" replacing "odd-numbered element", with "First Offset Average" replacing "Even Offset Average", and with "Second Offset Average" or "Third Offset Average" replacing "Odd Offset Overage".

In one example of each of the first, second and third methods, output values of light sensor elements of a linear sensor array of a dual channel scanner are quickly calibrated including compensation for differences between channels.

The foregoing description of several methods of the present invention has been presented for purposes of illustration. It is not intended to be exhaustive or to limit the present invention to the precise steps and/or forms disclosed, and obviously many modifications and variations are possible in light of the above teaching. It is intended that the scope of the present invention be defined by the claims appended hereto.

What is claimed is:

1. A method for calibrating a plurality of individual light sensor elements of a linear sensor array of a scanner, wherein output values of odd-numbered elements are carried by a first output channel and output values of even-numbered elements are carried by a second output channel, comprising:
   calculating a relative gain (Stored Gain) for each element from a scan of a light calibration strip area of substantial uniformity;
   obtaining output values of the elements from a scan of a light calibration strip area of unknown uniformity;
   calculating an average of the obtained output values of the odd-numbered elements (Odd Light Average) and an average of the obtained output values of the even-numbered elements (Even Light Average) from the scan of the light calibration strip area of unknown uniformity;
   calculating a low pass gain for each element from the obtained output values of the elements from the scan of the light calibration strip area of unknown uniformity;
   calculating an adjusted gain for each even-numbered element and each odd-numbered element, the adjusted gain for each even-numbered element being equal to its Stored Gain, and the adjusted gain for each odd-numbered element being equal to its Stored Gain times the Even Light Average divided by the Odd Light Average; and
   calculating a final gain for each element, the final gain being equal to its adjusted gain times its low pass gain.

2. The method of claim 1, further comprising setting a gain of each element to equal its final gain.

3. The method of claim 1, wherein the obtained output values of the elements from the scan of the light calibration strip area of unknown uniformity are average output values of each element from a multi-line scan of the light calibration strip area of unknown uniformity.

4. The method of claim 1, wherein the Stored Gain for each element is calculated from a factory scan of the light calibration strip area of substantial uniformity.

5. The method of claim 1, wherein the obtained output values of the elements from the scan of the light calibration strip area of unknown uniformity are obtained from a non-factory scan of the light calibration strip area of unknown uniformity.

6. The method of claim 5, wherein the non-factory scan is of thelight calibration strip area is performed at a different time from a factory scan of the light calibration strip area.

7. The method of claim 1, wherein the light calibration strip area of substantial uniformity is a white calibration strip area of substantial uniformity, and wherein the light calibration strip area of unknown uniformity is a white calibration strip area of unknown uniformity.

8. The method of claim 1, wherein the elements are white-light sensor elements.

9. The method of claim 1, further comprising:
   calculating an offset (Stored Offset) for each element from a scan of a dark calibration strip area of substantial uniformity;
   obtaining dark output values of the elements from a scan of a dark calibration strip area of unknown uniformity;
   calculating an average of the obtained dark output values of the odd-numbered elements (Odd Offset Average) and an average of the obtained dark output values of the even-numbered elements (Even Offset Average) from the scan of the dark calibration strip area of unknown uniformity;
   calculating a low pass offset for each element from the obtained dark output values from the scan of the dark calibration strip area of unknown uniformity;
   calculating an adjusted offset for each element, the adjusted offset of each even-numbered element being equal to its Stored Offset and the adjusted offset of each odd-numbered element being equal to its Stored Offset plus the Odd Offset Average minus the Even Offset Average, or the adjusted offset for each odd-numbered element being equal to its Stored Offset and the adjusted offset of each even-numbered element being equal to its Stored Offset plus the Even Offset Average minus the Odd Offset Average; and
   calculating a final offset for each element as equal to its adjusted offset plus its low pass offset.

10. The method of claim 1, wherein the dark calibration strip area of substantial uniformity is a black calibration strip area of substantial uniformity, and wherein the dark calibration strip area of unknown uniformity is a black calibration strip area of unknown uniformity.

11. A method for calibrating a plurality of individual light sensor elements of a linear sensor array of a scanner, wherein output values of odd-numbered elements are carried by a first output channel and output values of even-numbered elements are carried by a second output channel, comprising:
   calculating a relative gain (Stored Gain) for each element from a scan of a light calibration strip area of substantial uniformity;
   obtaining output values of the elements from a scan of a light calibration strip area of unknown uniformity;
   calculating an average of the obtained output values of the odd-numbered elements (Odd Light Average) and an average of the obtained output values of the even-numbered elements (Even Light Average) from the scan of the light calibration strip area of unknown uniformity;
   calculating a low pass gain for each element from the obtained output values from the scan of the light calibration strip area of unknown uniformity;
   calculating an adjusted gain for each odd-numbered element and for each even-numbered element, the adjusted gain for each odd-numbered element being equal to its Stored Gain, and the adjusted again for each even-numbered element being equal to its Stored Gain times the Odd Light Average divided by the Even Light Average; and calculating a final gain for each element, the final gain being equal to its adjusted gain times its low pass gain.

12. The method of claim 11, further comprising setting a gain of each element to equal its final gain.

13. The method of claim 11, wherein the obtained output values of the elements from the scan of the light calibration strip area of unknown uniformity are obtained average output values of each element from multi-line scanning of the light calibration strip area of unknown uniformity.

14. The method of claim 11, wherein the Stored Gain for each element is calculated from a factory scan of the light calibration strip area of substantial uniformity.

15. The method of claim 11, wherein the obtained output values of the elements from the scan of the light calibration strip area of unknown uniformity are obtained from a non-factory scan of the light calibration strip area of unknown uniformity.

16. The method of claim 15, wherein the non-factory scan of the light calibration strip area is performed at a different time from a factory scan of the light calibration strip area.

17. The method of claim 11, wherein the light calibration strip area of substantial uniformity is a white calibration strip area of substantial uniformity, and wherein the light calibration strip area of unknown uniformity is a white calibration strip area of unknown uniformity.

18. The method of claim 11, wherein the individual light sensor elements are individual white-light sensor elements.

19. The method of claim 11, further comprising:
calculating a relative offset (Stored Offset) for each element from a scan of a dark calibration strip area of substantial uniformity;
obtaining dark output values of the elements from a scan of a dark calibration strip area of unknown uniformity;
calculating an average of the obtained dark output values of the odd-numbered elements (Odd Offset Average) and an average of the obtained dark output values of the even-numbered elements (Even Offset Average) from the scan of the dark calibration strip area of unknown uniformity;
calculating a low pass offset for each of the first and second elements from the obtained dark output values from the scan of the dark calibration strip area of unknown uniformity;

calculating an adjusted offset for each element, the adjusted offset for each even-numbered element being equal to its Stored Offset and the adjusted offset of each odd-numbered element being equal to its Stored Offset plus the Odd Offset Average minus the Even Offset Average, or the adjusted offset for each odd-numbered element being equal to its Stored Offset and the adjusted offset of each even-numbered element being equal to its Stored Offset plus the Even Offset Average minus the Odd Offset Average; and calculating a final offset for each element as equal to its adjusted offset plus its low pass offset.

20. A method for calibrating at least some individual light sensor elements of a linear sensor array of a scanner, wherein output values of a first plurality of first elements are carried by a first output channel and output values of a second plurality of second elements are carried by a second output channel, comprising:

calculating a relative gain (Stored Gain) for each of the first and second elements from a scan of a light calibration strip area of substantial uniformity;

obtaining output values of the first and second elements from a scan of a light calibration strip area of unknown uniformity;

calculating an average of the obtained output values of the first elements (First Light Average) and an average of the obtained output values of the second elements (Second Light Average) from the scan of the light calibration strip area of unknown uniformity;

calculating a low pass gain for each first and second element from the obtained output values from the scan of the light calibration strip area of unknown uniformity;

calculating an adjusted gain for each first element and;

for each second element, the adjusted gain for each first element being equal to its Stored Gain and the adjusted gain for each second element being equal to its Stored Gain times the First Light Average divided by the Second Light Average; and calculating a final gain for each first and second element as equal to its adjusted gain times its low pass gain.

* * * * *